United States Patent [19]

Borkowski

[11] 4,203,508

[45] May 20, 1980

[54] WHEEL CYLINDER ATTACHMENT

[75] Inventor: Donald F. Borkowski, South Bend, Ind.

[73] Assignee: The Bendix Corporation, Southfield, Mich.

[21] Appl. No.: 921,919

[22] Filed: Jul. 3, 1978

[51] Int. Cl.² .................. F16D 65/22; F16D 51/24
[52] U.S. Cl. ...................... 188/325; 92/161; 188/364; 192/75; 192/85 AT
[58] Field of Search .............. 188/362, 363, 364, 78, 188/323, 325; 192/85 AT, 75; 92/146, 161

[56] References Cited

U.S. PATENT DOCUMENTS

| | | | |
|---|---|---|---|
| 2,107,403 | 2/1938 | Weatherhead, Jr. | 188/364 X |
| 2,213,948 | 9/1940 | Bowen | 188/364 X |
| 2,266,079 | 12/1941 | Roche | 188/363 X |

Primary Examiner—George E. A. Halvosa
Attorney, Agent, or Firm—Paul David Schoenle; Ken C. Decker

[57] ABSTRACT

A drum brake includes a wheel cylinder which cooperates with a pair of brake shoes to urge the latter to a braking position. In order to attach the wheel cylinder to a backing plate, a flange is disposed in abutment with the backplate and the wheel cylinder and a nut cooperates with the flange and the wheel cylinder to prevent separation between the wheel cylinder and the backing plate. Moreover, the nut and flange include openings for receiving a fitting communicating with the wheel cylinder. The nut extends through the flange opening to engage the wheel cylinder and the nut opening is dimensioned to receive the fitting in spaced relation thereto.

2 Claims, 5 Drawing Figures

WHEEL CYLINDER ATTACHMENT

BACKGROUND OF THE INVENTION

A drum brake assembly generally secures a wheel cylinder to a backing plate and the wheel cylinder is operable to urge a pair of brake shoes to a braking position. In attaching the wheel cylinder to the backing plate, a plurality of bolts are inserted in openings on the backing plate and are threadably engaged with bores provided on the wheel cylinder. As a result the cast wheel cylinder is required to provide lugs for forming bores to receive the bolts. These lugs deviate from the cylindrical shape of the body of the wheel cylinder and are costly to provide with the body of the wheel cylinder.

SUMMARY OF THE INVENTION

In the present invention a wheel cylinder with a fitting extending therefrom is attached to a backing plate by a flange and a nut. The flange is disposed on the side of the backing plate opposite the body of the wheel cylinder and is in engagement with a boss on the wheel cylinder extending from the body of the wheel cylinder through an opening on the backing plate and supporting the fitting. The boss forms a stepped bore with a small diameter portion for receiving the fitting and a large diameter portion for receiving the nut. The flange and nut include openings and the nut extends through the flange to engage the large diameter portion of the boss while the fitting extends through the nut opening in spaced relation thereto so as to engage the small diameter portion of the boss.

It is an object of the present invention to provide an improved attachment to secure a wheel cylinder to a backing plate.

DETAILED DESCRIPTION

Figure 1:
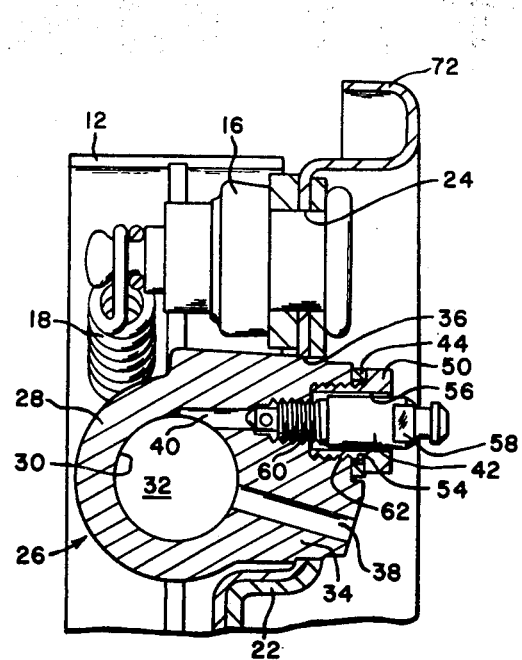
FIG. 1 is a partial cross-sectional view of a drum brake assembly showing a wheel cylinder attached to a backing plate in accordance with the present invention.
Figure 2:
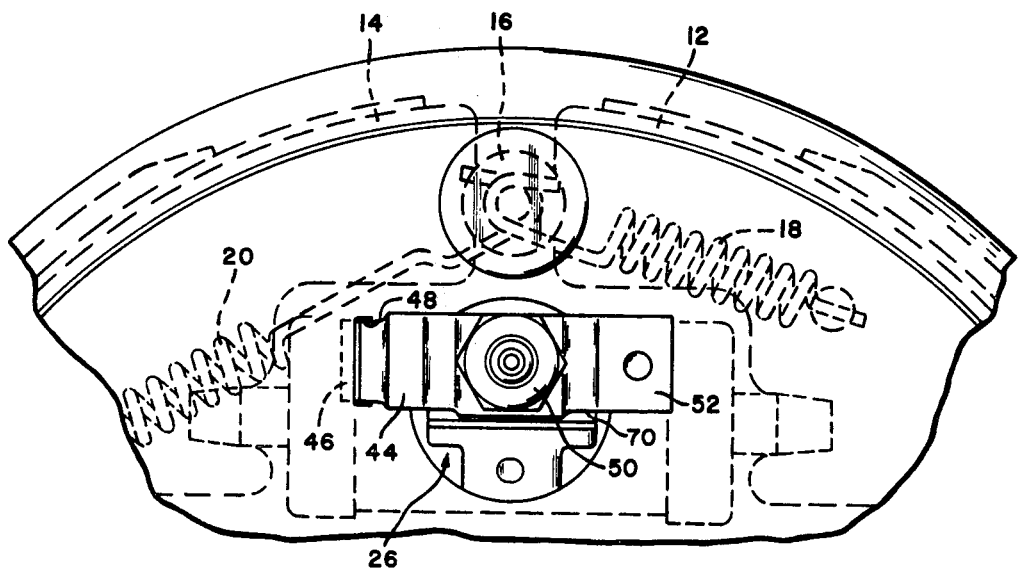
FIG. 2 is a left side view of FIG. 1.

In the drum brake assembly of FIGS. 1 and 2, a pair of brake shoes 12 and 14 are biased into engagement with an anchor pin 16 by retraction springs 18 and 20. A backing plate 22 includes an opening at 24 for receiving and supporting the anchor pin 16. A wheel cylinder, or hydraulic actuator, 26 cooperates with the pair of brake shoes in a conventional manner to expand the latter to a braking position when braking is effectuated.

The wheel cylinder 26 includes a cylinderical body portion 28 with a bore 30 for receiving a piston 32. Extending from the cylindrical body portion 28 is a boss 34 which extends through another opening 36 on the backing plate 22. The boss 34 forms a first passage 38 and a second passage 40 which communicate with the bore 30. The passage 38 communicates pressurized fluid to the bore 30 from a fluid pressure generator, not shown, such as a master cylinder, and the passage 40 provides a bleed orifice for draining air or other impurities from the fluid within the bore 30. A fitting 42 extends into the passage 40 and is operable to open or close communication therethrough.

In accordance with the invention, a flange 44 includes a tab 46 extending into a slot 48 on the backing plate 22 and a nut 50 cooperates with the wheel cylinder 26 and the flange 44 in a manner hereinafter described to secure the wheel cylinder to the backing plate 22. The flange is permanently secured by welding or other suitable means at the end 52 remote from the tab 46 to the backing plate 22. The flange is provided with an opening 54 for receiving the nut 50 and the nut 50 is also provided with an opening 56 for receiving the fitting 42 in spaced relation thereto. Moreover, the outer diameter of the head 58 on the fitting 42 is smaller than the inner diameter of opening 56 to permit assembly of the wheel cylinder and fitting to the flange and backing plate.

Viewing FIG. 1 it is seen that the passage 40 is stepped with a small diameter 60 threadably engaging the fitting 42 and a large diameter 62 threadably engaging the nut 50.

Figure 3:
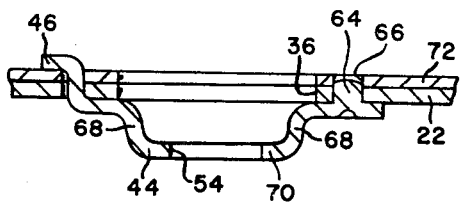
FIG. 3 is a top view of a flange and the backing plate of FIG. 1.

Turning to FIG. 3, the end 52 of the flange 44 includes a projection 64 extending into an opening 66 on the backing plate 22 for locating the flange on the latter before fastening the flange to the backing plate.

Figure 4:
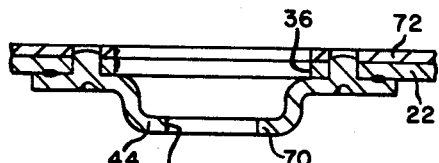
FIG. 4 is a view similar to FIG. 3 showing a modified embodiment of the flange and backing plate.

In the modification of FIG. 4, both ends of the flange are provided with projections to locate the flange on the backing plate before fastening the flange thereto and the tab and slot of FIGS. 2 and 3 are omitted.

Figure 5:
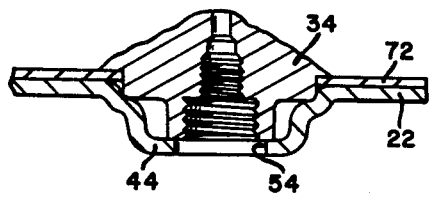
FIG. 5 is a view similar to FIG. 3 showing the flange and backing plate comprising an integral structure.

Finally, FIG. 5 provides for the flange 44 to be integrally formed from the backing plate 22. When formed with the backing plate, the flange 46 is deformed outwardly from the backing plate so that a portion of the wheel cylinder boss will be received in the opening 36 when the boss abuts the deformed flange 46.

Although the modified flanges of FIGS. 4 and 5 show different structures for providing a flange which is attached to the backing plate 22, all of the flanges herein include openings at 54 for receiving a nut as described above. Moreover, the flanges 44 are formed with bends at 68 to separate the raised intermediate portion 70 of the flanges from the plane defined by the backing plate 22. An optional dust shield 72 is attached to the backing plate 22. The raised intermediate portion 70 having a lenghth substantially equal to the diameter of opening 36.

There are many modifications and/or variations to the present invention described herein and it is intended that these modifications and/or variations are covered by the scope of the appended claims.

I claim:

1. In a drum brake assembly having a backing plate supporting a pair of brake shoes, a wheel cylinder cooperating with the pair of brake shoes to urge the latter to a braking position and connecting means attaching the wheel cylinder to the backing plate, the improvement wherein said connecting means comprises a flange secured to the backing plate and a nut forming an interlocking fit with the flange, the wheel cylinder including a stepped bore having a small diameter portion and a large diameter portion, the small diameter portion receiving a fitting and the large diameter portion receiving the nut, said nut extending through an opening in said flange to releasably engage said large diameter portion and said nut including an opening for receiving said fitting, said fitting defining an open space with said nut to maintain said fitting in spaced relation thereto.

2. The drum brake assembly of claim 1 in which said flange includes means to locate said flange on said backing plate independently of said wheel cylinder, fitting, and nut.

* * * * *